US012636672B2

(12) United States Patent
Urakami et al.

(10) Patent No.: US 12,636,672 B2
(45) Date of Patent: May 26, 2026

(54) COATING DEVICE HAVING A COATING DIE CONFIGURED TO DISCHARGE A COATING LIQUID ONTO A WORKPIECE

(71) Applicants: Taichi Urakami, Nisshin (JP); Seiji Ishizu, Toyota (JP); Yu Ichino, Kariya (JP); Masakazu Umehara, Toyota (JP); Naohiro Ishizuka, Sendai (JP); Naoya Kishimoto, Nagoya (JP)

(72) Inventors: Taichi Urakami, Nisshin (JP); Seiji Ishizu, Toyota (JP); Yu Ichino, Kariya (JP); Masakazu Umehara, Toyota (JP); Naohiro Ishizuka, Sendai (JP); Naoya Kishimoto, Nagoya (JP)

(73) Assignees: Toyota Jidosha Kabushiki Kaisha, Toyota (JP); Toyota Battery Co., Ltd., Kosai (JP); Prime Planet Energy & Solutions, Inc., Tokyo (JP)

( * ) Notice: Subject to any disclaimer, the term of this patent is extended or adjusted under 35 U.S.C. 154(b) by 457 days.

(21) Appl. No.: 18/242,588

(22) Filed: Sep. 6, 2023

(65) Prior Publication Data

US 2024/0082871 A1 Mar. 14, 2024

(30) Foreign Application Priority Data

Sep. 9, 2022 (JP) ................................ 2022-144101

(51) Int. Cl.
*B05C 5/02* (2006.01)

(52) U.S. Cl.
CPC .......... *B05C 5/0245* (2013.01); *B05C 5/0254* (2013.01)

(58) Field of Classification Search
None
See application file for complete search history.

(56) References Cited

U.S. PATENT DOCUMENTS

2006/0066156 A1* 3/2006 Dong .................... H02K 9/225 310/54
2012/0017827 A1* 1/2012 Ishizu .................... B05C 5/027 118/602
2018/0150000 A1* 5/2018 Takagi ................. F16C 13/022

FOREIGN PATENT DOCUMENTS

| | | | |
|---|---|---|---|
| CN | 114030288 | A | 2/2022 |
| JP | H10-314644 | A | 12/1998 |
| JP | 2021-130066 | A | 9/2021 |
| WO | 2017/130380 | A1 | 8/2017 |

* cited by examiner

*Primary Examiner* — Binu Thomas
(74) *Attorney, Agent, or Firm* — Dinsmore & Shohl LLP

(57) ABSTRACT

A coating device includes a backup roll configured to transport a workpiece; a coating die configured to discharge a coating liquid onto the workpiece; a drive section capable configured to drive the backup roll; and a heat dissipation section configured to dissipate heat generated in the drive section.

4 Claims, 3 Drawing Sheets

COATING DEVICE HAVING A COATING DIE CONFIGURED TO DISCHARGE A COATING LIQUID ONTO A WORKPIECE

CROSS-REFERENCE TO RELATED APPLICATION

This application is based on and claims priority under 35 USC 119 from Japanese Patent Application No. 2022-144101 filed on Sep. 9, 2022, the disclosure of which is incorporated by reference herein.

BACKGROUND

Technical Field

The present disclosure is related to a coating device.

Related Art

Japanese Patent Application Laid-Open (JP-A) No. 2021-130066 discloses technology related to a coating device. This coating device uses a coating gap adjustment section to deform a rib base section supporting a rib leading end portion forming a discharge port of a slit die so as to enable a coating gap to be adjusted. The related technology according to JP-A No. 2021-130066 is accordingly able to raise a certainty that a film thickness of a coating liquid falls within a standard range even when a slit die deforms due to a temperature change or the like.

A conceivable reason for the film thickness of a coating liquid deviating from the standard range is that heat transmitted to a backup roll supporting a workpiece deforms the backup roll.

However, JP-A No. 2021-130066 does not consider suppressing transmission of heat to the backup roll, and there is room for improvement in the technology described above from the perspective of suppressing heat from being transmitted to the backup roll.

SUMMARY

In consideration of the above circumstances, the present disclosure provides a coating device capable of suppressing heat from being transmitted to a backup roll.

A first aspect of the present disclosure is a coating device including a backup roll configured to transport a workpiece; a coating die configured to discharge a coating liquid onto the workpiece; a drive section capable configured to drive the backup roll; and a heat dissipation section configured to dissipate heat generated in the drive section.

In the first aspect, the workpiece is transported by the backup roll driven by the drive section, and the coating liquid is coated onto the workpiece by the coating liquid being discharged from the coating die onto the workpiece.

However, conceivably when the drive section is driven the drive section generates heat due to load on the drive section. Such heat from the drive section might conceivably deform the backup roll by being transmitted to the backup roll, such that the film thickness of the coating liquid is no longer is able to be contained within the standard range.

The present disclosure is accordingly equipped with the heat dissipation section, enabling heat generated by the drive section to be dissipated by the heat dissipation section, and as a result this enables a reduction in the amount of heat transmitted from the drive section to the backup roll.

A coating device according to a second aspect of the present disclosure is the first aspect, further including a thermal insulation section disposed between the backup roll and the drive section.

In the second aspect, the thermal insulation section is disposed between the backup roll and the drive section, and a transmission path of heat generated in the drive section to the backup roll is blocked by the thermal insulation section.

A coating device according to a third aspect of the present disclosure is the second aspect, further including a support section configured to support the backup roll, wherein the thermal insulation section is interposed between the support section and the drive section.

In the third aspect, the backup roll is supported by the support section, and the thermal insulation section is interposed between the support section and the drive section. The present disclosure is thereby able to block transmission of heat from the drive section to the backup roll at a position near to the backup roll.

A coating device according to a fourth aspect of the present disclosure is any one of the first to third aspects, wherein the drive section includes a speed reduction section coupled to the backup roll, and a drive motor that is configured to input drive force to the speed reduction section, and a portion of the heat dissipation section is interposed between the speed reduction section and the drive motor.

In the fourth aspect the drive section includes the speed reduction section coupled to the backup roll and the drive motor. The rotation speed and rotation force of the backup roll is adjusted by the drive force of the drive motor being input through the speed reduction section.

However, the heat generated from the drive section is mainly generated from the drive motor, and therefore to suppress heat transmission to the backup roll, in some embodiments, heat generated by the drive motor may be dissipated in the vicinity of the drive motor.

In the present disclosure a portion of the heat dissipation section is interposed between the speed reduction section and the drive motor, heat generated in the drive motor is dissipated in the vicinity of the drive motor, and this heat may be suppressed from being transmitted to the speed reduction section.

A coating device according to a fifth aspect of the present disclosure is the fourth aspect, wherein the heat dissipation section includes an interpose section interposed between the speed reduction section and the drive motor, and a heat dissipation plate provided as a single body with the interpose section or integrally provided to the interpose section, and disposed with a clearance to the drive motor.

In the fifth aspect the heat dissipation section includes the interpose section, and the heat dissipation plate provided as a single body with the interpose section or integrally provided to the interpose section. The interpose section is interposed between the speed reduction section and the drive motor, enabling heat from the drive motor to be suppressed from being transmitted to the speed reduction section by the interpose section.

The interpose section and the extra heat dissipation plate are provided, enabling a larger surface area to be secured for dissipating the heat transmitted from the drive motor.

Furthermore, in the present disclosure, the heat dissipation plate is disposed with a clearance to the drive motor, and so even if the drive motor vibrates when the drive motor is driven, interference between the heat dissipation plate and the drive motor may be suppressed from occurring.

As described above, the coating device according to the first aspect is able to suppress heat from being transmitted to the backup roll.

The coating device according to the second aspect is able to suppress heat from being transmitted to the backup roll.

The coating device according to the third aspect is able to suppress heat from being transmitted to peripheral portions of the backup roll.

The coating device according to the fourth aspect is able to raise the certainty that heat generated in the drive section is dissipated at the periphery of the drive section.

The coating device according to the fifth aspect is able to drive the drive section in a stable state while securing an amount of heat dissipation.

BRIEF DESCRIPTION OF THE DRAWINGS

Exemplary embodiments of the present disclosure will be described in detail based on the following figures, wherein.

DETAILED DESCRIPTION

Figure 1:
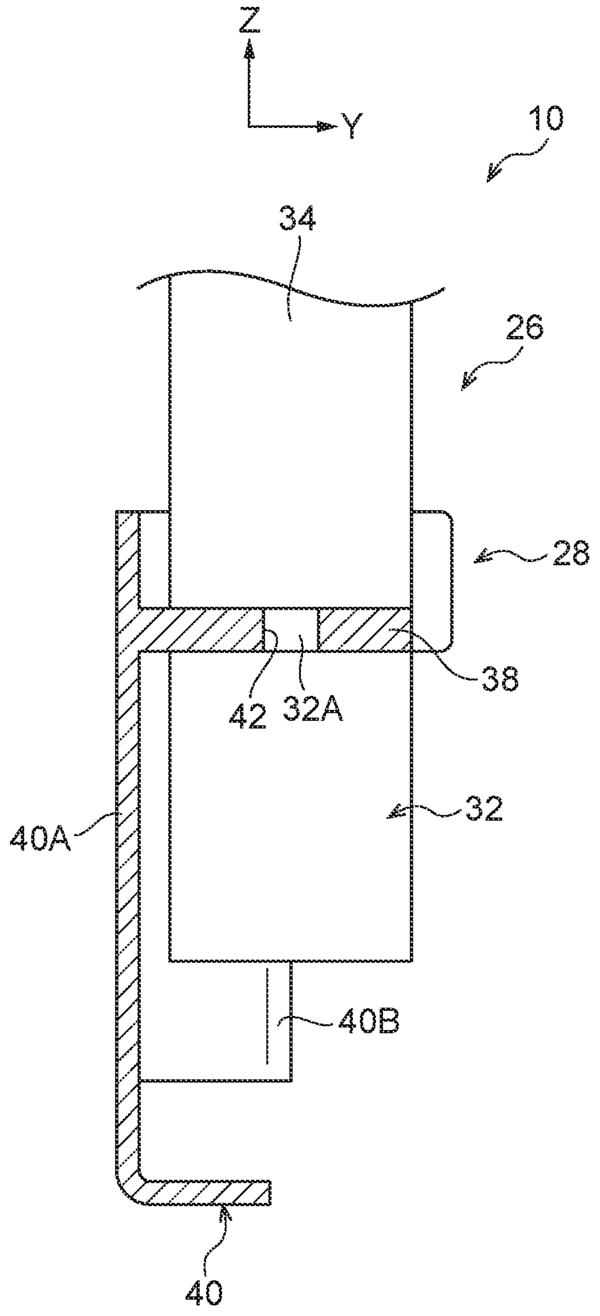
FIG. 1 is a cross-section illustrating a schematic configuration of a heat dissipation section periphery in a coating device according to the present exemplary embodiment.
Figure 2:
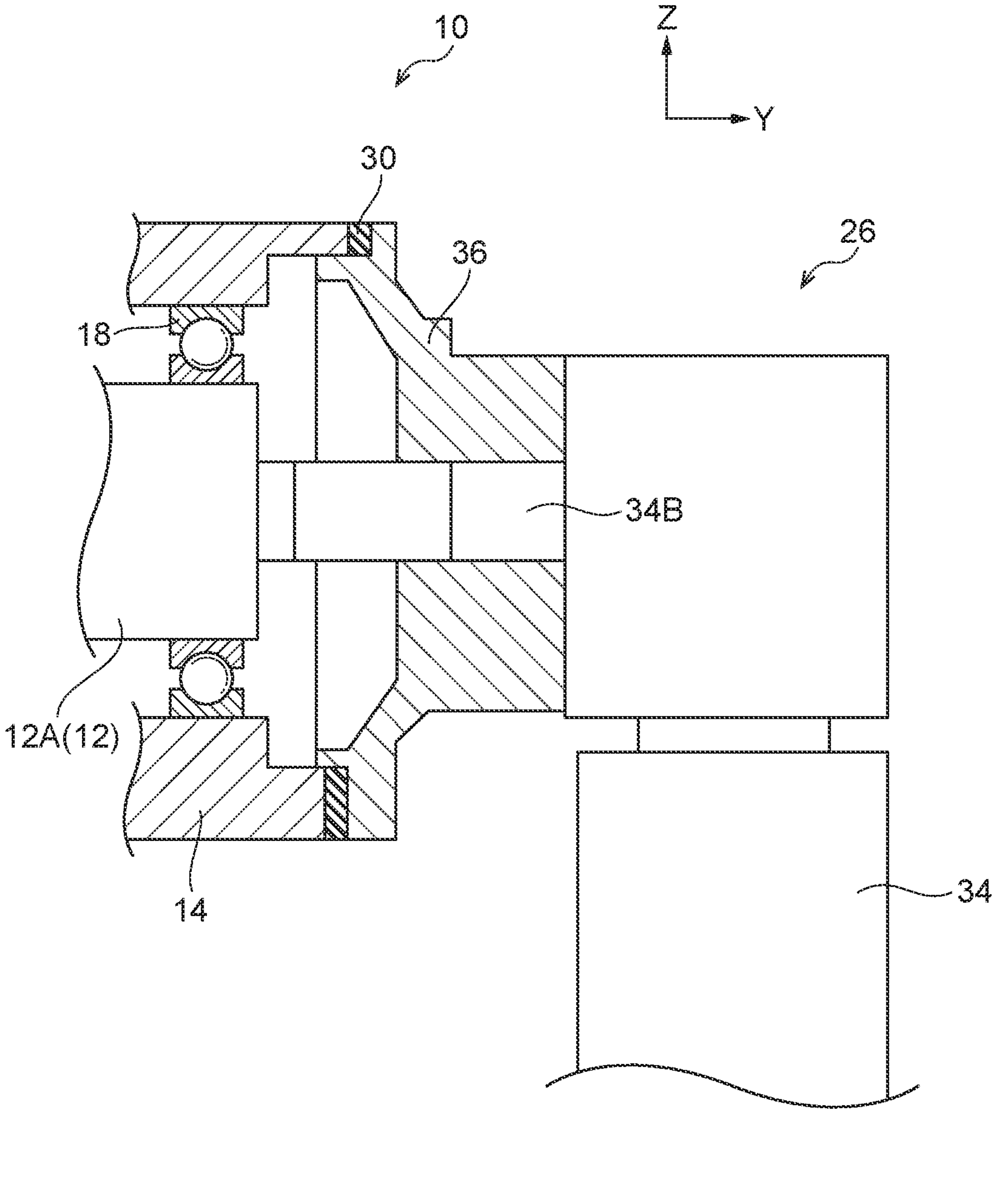
FIG. 2 is a cross-section illustrating a schematic configuration of a boundary between a backup roll and a drive section in a coating device according to the present exemplary embodiment.
Figure 3:
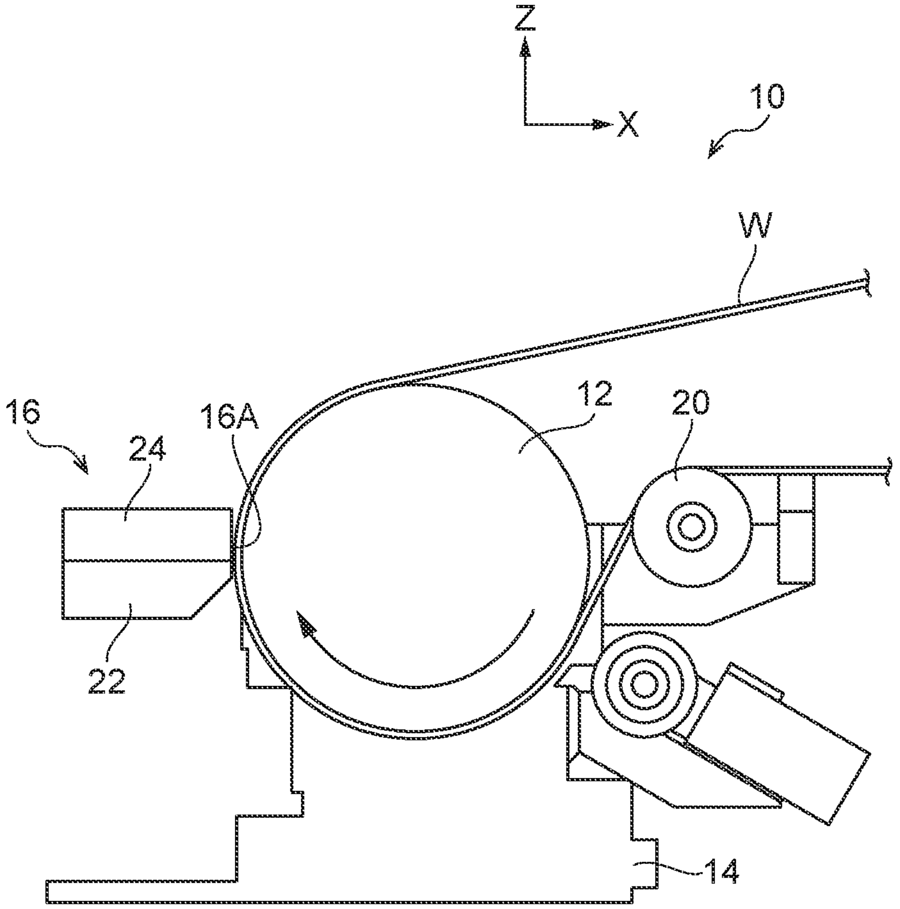
FIG. 3 is a side view schematically illustrating an outline configuration of a coating device according to the present exemplary embodiment.

Description follows regarding an example of an exemplary embodiment of a "coating device 10" according to the present disclosure, with reference to FIG. 1 to FIG. 3. Note that in the drawings an arrow X indicates a front-rear direction one side of the coating device 10, an arrow Y indicates a width direction one side of the coating device 10, and an arrow Z indicates a height direction upper side of the coating device 10. In the following the front-rear direction of the coating device 10 is simply referred to as a front-rear direction, the width direction of the coating device 10 is simply referred to as a width direction, and a height direction of the coating device 10 is simply referred to as a height direction.

As illustrated in FIG. 3, the coating device 10 includes a backup roll 12 capable of transporting a workpiece W, a support section 14 that supports the backup roll 12, and a coating die 16.

The backup roll 12 has a circular pillar shaped external profile and is disposed with an axial direction along the width direction. A configuration is adopted in which a back surface of the workpiece W contacts a front surface of the backup roll 12. Examples of the workpiece W include a metal foil or the like.

As illustrated in FIG. 2, the support section 14 supports an end portion 12A of the backup roll 12 through a bearing 18. A roll 20 that enables the workpiece W to be fed to the backup roll 12 is attached to the support section 14.

The coating die 16 includes an upstream die body 22 and a downstream die body 24, and is configured so as to discharge a coating liquid supplied from a non-illustrated coating liquid supply section through a discharge port 16A and onto the front surface of the workpiece W. A clearance between the coating die 16 and the backup roll 12 is set to a specific clearance. Note that the clearance between the coating die 16 and the backup roll 12 is called a coating gap hereafter. The coating die 16 has a positional relationship with respect to the backup roll 12 that is adjustable using a non-illustrated movement device.

As illustrated in FIG. 1 and FIG. 2, a first feature of the present exemplary embodiment is that a heat dissipation section 28 is provided to a drive section 26 that drives the backup roll 12. A second feature thereof is that a thermal insulation section 30 is provided between the support section 14 and the drive section 26. Detailed explanation follows regarding a configuration of the drive section 26, the heat dissipation section 28, and the thermal insulation section 30.

The drive section 26 includes a drive motor 32, a speed reduction section 34 coupled to the drive motor 32, and a coupling member 36 interposed between the speed reduction section 34 and the support section 14.

The drive motor 32 is drivable at a specific rotation speed and drive force by being supplied with electrical power from a non-illustrated electric power supply section.

The speed reduction section 34 is configured including a case and plural gears built into the case, and is able to adjust output from the drive motor 32 to a rotation speed and drive force suitable for running the backup roll 12. An output shaft 34B of the speed reduction section 34 is coupled to the end portion 12A of the backup roll 12, such that output from the drive motor 32 is transmitted through the speed reduction section 34 to the backup roll 12.

The heat dissipation section 28 includes an interpose section 38 employed for attachment to the heat dissipation section 28, and a heat dissipation plate 40 configuring a main part of the heat dissipation section 28.

More specifically, the interpose section 38 has a plate shape with a plate thickness direction in the height direction, and is configured so as to be in a state clamped between the drive motor 32 and the speed reduction section 34. Note that a through hole 42 is formed through the interpose section 38 for inserting the output shaft 32A of the drive motor 32 through.

The heat dissipation plate 40 is configured including a main plate portion 40A configuring a main part thereof, and a pair of extension plate portions 40B. Note that the heat dissipation plate 40 is not necessarily integrated to the interpose section 38, and may be attached to the interpose section 38 by an attachment member or the like.

More specifically, the main plate portion 40A has a plate shape with a plate thickness direction in a width direction and extends in the front-rear direction and the height direction. The main plate portion 40A overlaps with the drive motor 32 when viewed along the width direction, and is disposed in a state such that there is a clearance to the drive motor 32 in the width direction.

The extension plate portions 40B are configured with plate shapes extending from respective peripheral edge portions at a front-rear direction one side and a front-rear direction other side of the main plate portion 40A toward the width direction one side, with a plate thickness direction along the front-rear direction.

The thermal insulation section 30 is, as an example, configured from foam rubber in a plate shape with a plate thickness direction in the width direction, and is disposed in a state clamped between the support section 14 and the coupling member 36.

Operation and Effects of the Present Exemplary Embodiment

Next, description follows regarding operation and effects of the present exemplary embodiment.

As illustrated in FIG. 3, in the coating device 10 according to the present exemplary embodiment the workpiece W is transported by the backup roll 12 driven by the drive section 26, and a coating liquid is coated onto the workpiece W by the coating liquid being discharged onto the workpiece W from the coating die 16.

However, when the drive section 26 is driven, conceivably heat is generated by the drive section 26 due to the load on the drive section 26. The heat of the drive section 26 might conceivably deform the backup roll 12 due to being transmitted to the backup roll 12, such that a film thickness of the coating liquid is no longer is able to be contained within the standard range.

In order to address this, as illustrated in FIG. 1 the present exemplary embodiment is equipped with the heat dissipation section 28, enabling heat generated in the drive section 26 to be dissipated by the heat dissipation section 28. As a result thereof, a reduction may be achieved in the amount of heat transmitted from the drive section 26 to the backup roll 12. Thus the present exemplary embodiment is able to suppress heat transmission to the backup roll 12.

As illustrated in FIG. 2, in the present exemplary embodiment the thermal insulation section 30 is also disposed between the backup roll 12 and the drive section 26, such that a transmission path to the backup roll 12 of heat generated in the drive section 26 is blocked by the thermal insulation section 30. The present exemplary embodiment accordingly enables heat transmission to the backup roll 12 to be suppressed even more.

Moreover, in the present exemplary embodiment the backup roll 12 is supported by the support section 14, and the thermal insulation section 30 is interposed between the support section 14 and the drive section 26. This means that in the present exemplary embodiment, heat transmission from the drive section 26 to the backup roll 12 may be blocked at a position near to the backup roll 12. The present exemplary embodiment is accordingly able to suppress heat from being transmitted to the peripheral portions of the backup roll 12.

Returning to FIG. 1, in the present exemplary embodiment the drive section 26 includes the speed reduction section 34 coupled to the backup roll 12, and the drive motor 32. This means that the rotation speed and rotation force of the backup roll 12 is adjusted by the drive force of the drive motor 32 being input through the speed reduction section 34.

However, heat generated from the drive section 26 is mainly generated from the drive motor 32, and so to suppress heat transmission to the backup roll 12, in some embodiments, heat generated by the drive motor 32 may be dissipated in the vicinity of the drive motor 32.

In order to address this, in the present exemplary embodiment a portion of the heat dissipation section 28 is interposed between the speed reduction section 34 and the drive motor 32, enabling heat generated in the drive motor 32 to be dissipated at the vicinity of the drive motor 32, and enabling this heat to be suppressed from being transmitted to the speed reduction section 34. This means that in the present exemplary embodiment, a certainty may be raised that heat generated by the drive section 26 is dissipated at the periphery of the drive section 26.

Moreover, in the present exemplary embodiment, the heat dissipation section 28 includes the interpose section 38, and includes the heat dissipation plate 40 provided either as a single body with the interpose section 38 or integrated thereto. The interpose section 38 is interposed between the speed reduction section 34 and the drive motor 32, enabling the heat of the drive motor 32 to be suppressed from being transmitted to the speed reduction section 34 by the interpose section 38.

The interpose section 38 and the extra heat dissipation plate 40 are provided, enabling a larger surface area to be secured for dissipating the heat transmitted from the drive motor 32.

Furthermore, in the present exemplary embodiment, the heat dissipation plate 40 is disposed with a clearance to the drive motor 32, such that even if the drive motor 32 vibrates when the drive motor 32 is driven, interference between the heat dissipation plate 40 and the drive motor 32 may be suppressed from occurring.

The present exemplary embodiment is accordingly able to drive the drive section 26 in a stable state while also securing an amount of heat dissipation.

Supplementary Explanation of Exemplary Embodiment (1) Although in the exemplary embodiment described above heat dissipation by the heat dissipation section 28 is mainly performed at the heat dissipation plate 40, depending on the specification or the like of the coating device 10, a configuration may be adopted in which heat dissipation fins or the like are provided to the heat dissipation plate 40.

(2) Although in the exemplary embodiment described above a configuration is adopted to dissipate heat transmitted from the drive section 26 to the heat dissipation section 28, depending on the specification or the like of the coating device 10, a configuration may be adopted to perform dissipation of heat from the drive section 26 using a cooling fan, a Peltier device, or the like.

What is claimed is:

1. A coating device comprising:

a backup roll configured to transport a workpiece;

a coating die configured to discharge a coating liquid onto the workpiece;

a drive section configured to drive the backup roll; and a heat dissipation section configured to dissipate heat generated in the drive section, wherein the drive section includes a speed reduction section coupled to the backup roll, and a drive motor that is configured to input drive force to the speed reduction section; and wherein a portion of the heat dissipation section is interposed between the speed reduction section and the drive motor.

2. The coating device of claim 1, further comprising a thermal insulation section disposed between the backup roll and the drive section.

3. The coating device of claim 2, further comprising:

a support section configured to support the backup roll, wherein the thermal insulation section is interposed between the support section and the drive section.

4. The coating device of claim 1, wherein:

the heat dissipation section includes an interpose section interposed between the speed reduction section and the drive motor; and a heat dissipation plate provided as a single body with the interpose section or integrally provided to the interpose section, and disposed with a clearance to the drive motor.

* * * * *